No. 737,434. PATENTED AUG. 25, 1903.
A. MEREEN.
HORIZONTAL BAND SAW FOR RESAWING BOX LUMBER.
APPLICATION FILED DEC. 22, 1902.
NO MODEL. 5 SHEETS—SHEET 3.

Witnesses
Inventor
Arno Mereen
By Paul Paul
His Attorneys

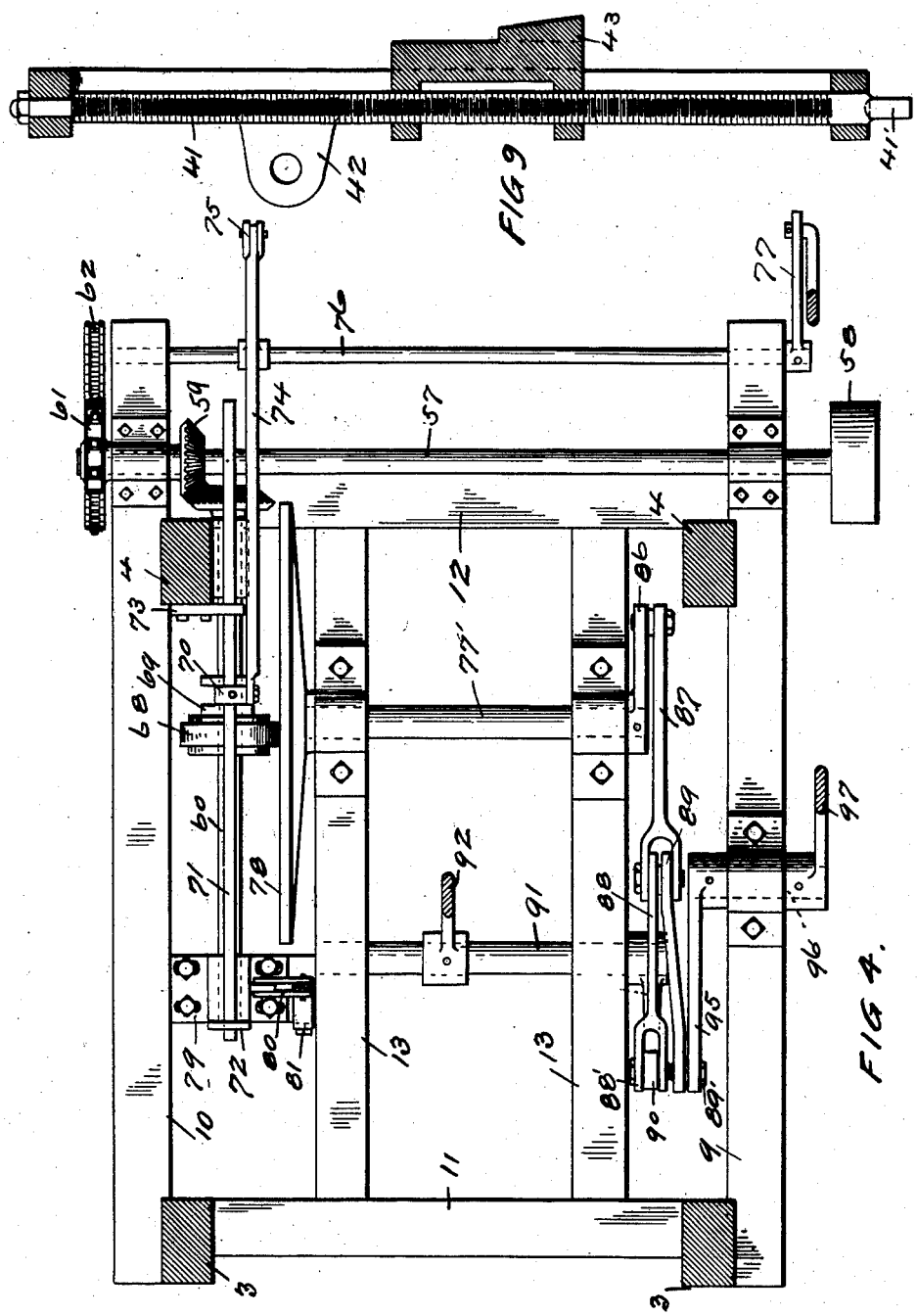

No. 737,434. PATENTED AUG. 25, 1903.
A. MEREEN.
HORIZONTAL BAND SAW FOR RESAWING BOX LUMBER.
APPLICATION FILED DEC. 22, 1902.
NO MODEL. 5 SHEETS—SHEET 5.
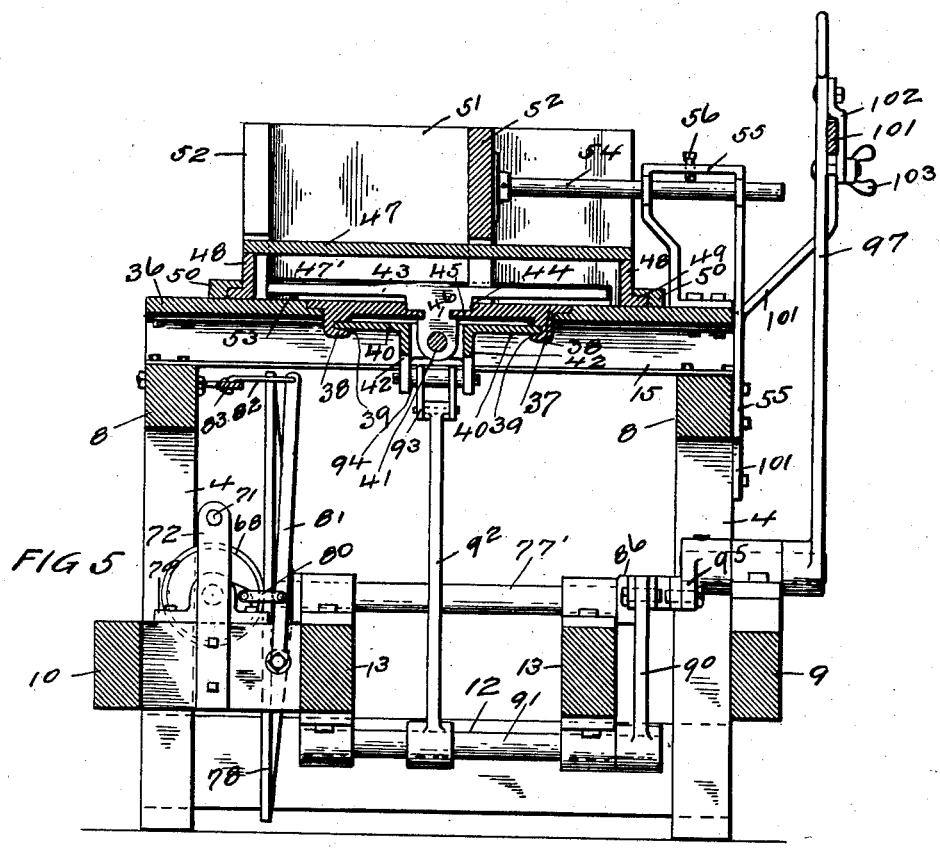

No. 737,434. Patented August 25, 1903.

UNITED STATES PATENT OFFICE.

ARNO MEREEN, OF MINNEAPOLIS, MINNESOTA.

HORIZONTAL BAND-SAW FOR RESAWING BOX-LUMBER.

SPECIFICATION forming part of Letters Patent No. 737,434, dated August 25, 1903.

Application filed December 22, 1902. Serial No. 136,159. (No model.)

*To all whom it may concern:*

Be it known that I, ARNO MEREEN, of Minneapolis, county of Hennepin, State of Minnesota, have invented certain new and useful Improvements in Horizontal Band-Saws for Resawing Box-Lumber, of which the following is a specification.

The invention relates to band resawing-machines of the horizontal type used for splitting lumber for the bottoms, sides, and covers of boxes.

The object of this invention is to provide a machine of greater capacity than the upright resaws usually employed for this purpose.

A further object is to provide a machine for resawing or splitting box-lumber which will deliver stock of uniform thickness and insure a smooth even surface for the stencil advertising marks or brands placed thereon.

A further object is to increase the output of the machine and prevent vibration and strain of the saw by providing a continuous feed of the lumber thereto.

Other objects of the invention will appear from the following detailed description.

The invention consists generally in means for feeding the lumber to the saw and for regulating the stroke of the feed mechanism according to the length of the lumber to be resawed.

Further, the invention consists in a saw and its feed-rolls operating at a uniform speed and a feed device operating at a variable speed to insure a continuous feed to the saw.

Further, the invention consists in means for feeding simultaneously to the saw the full width of the machine, if desired, the entire bottom, side, or top of the box, consisting of one or more boards, according to the width or depth of the box.

Further, the invention consists in means for simultaneously changing the speed and the stroke of the feed mechanism; and, further, the invention consists in various constructions and combinations, all as hereinafter described, and particularly pointed out in the claims.

Figure 1:
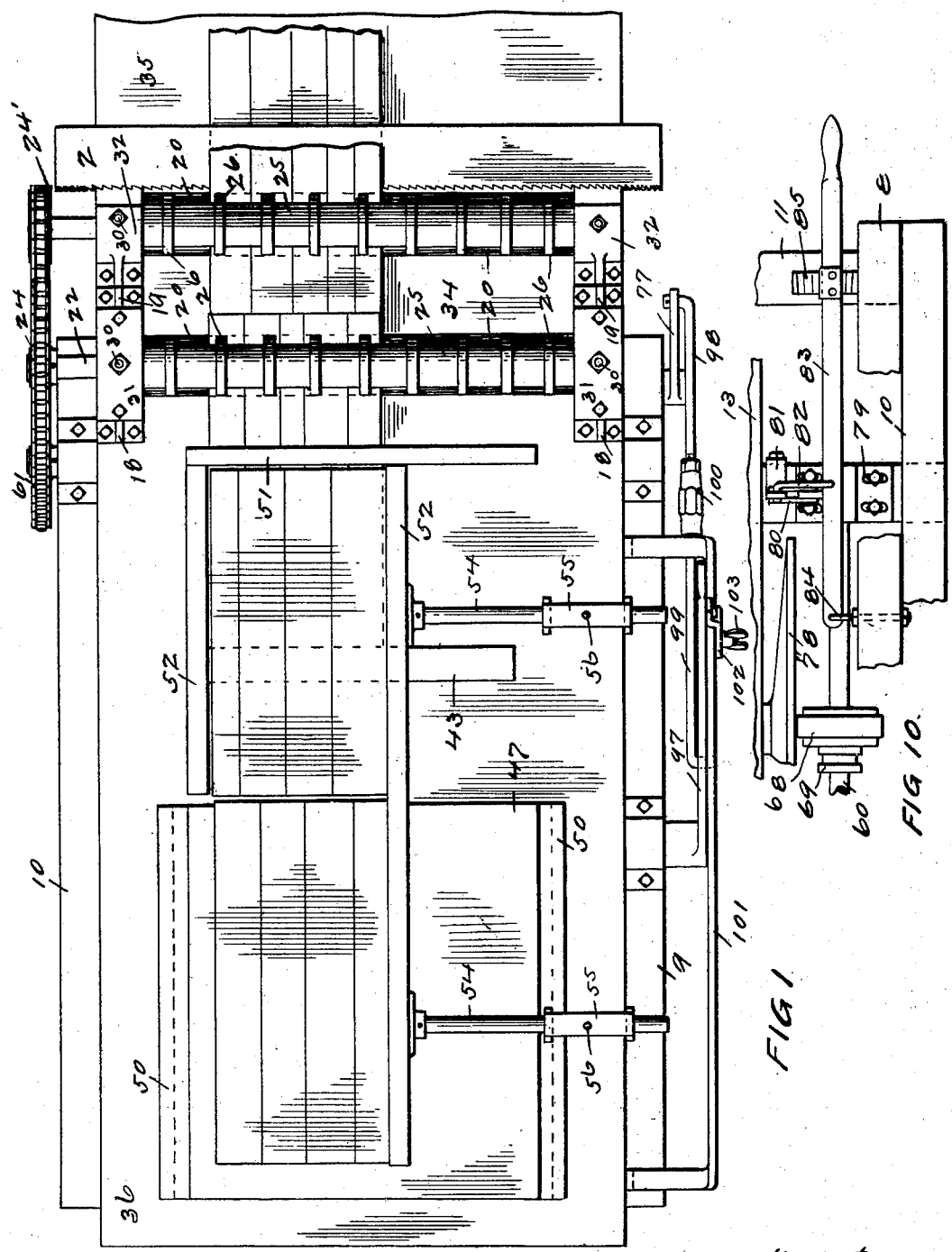
Figure 2:
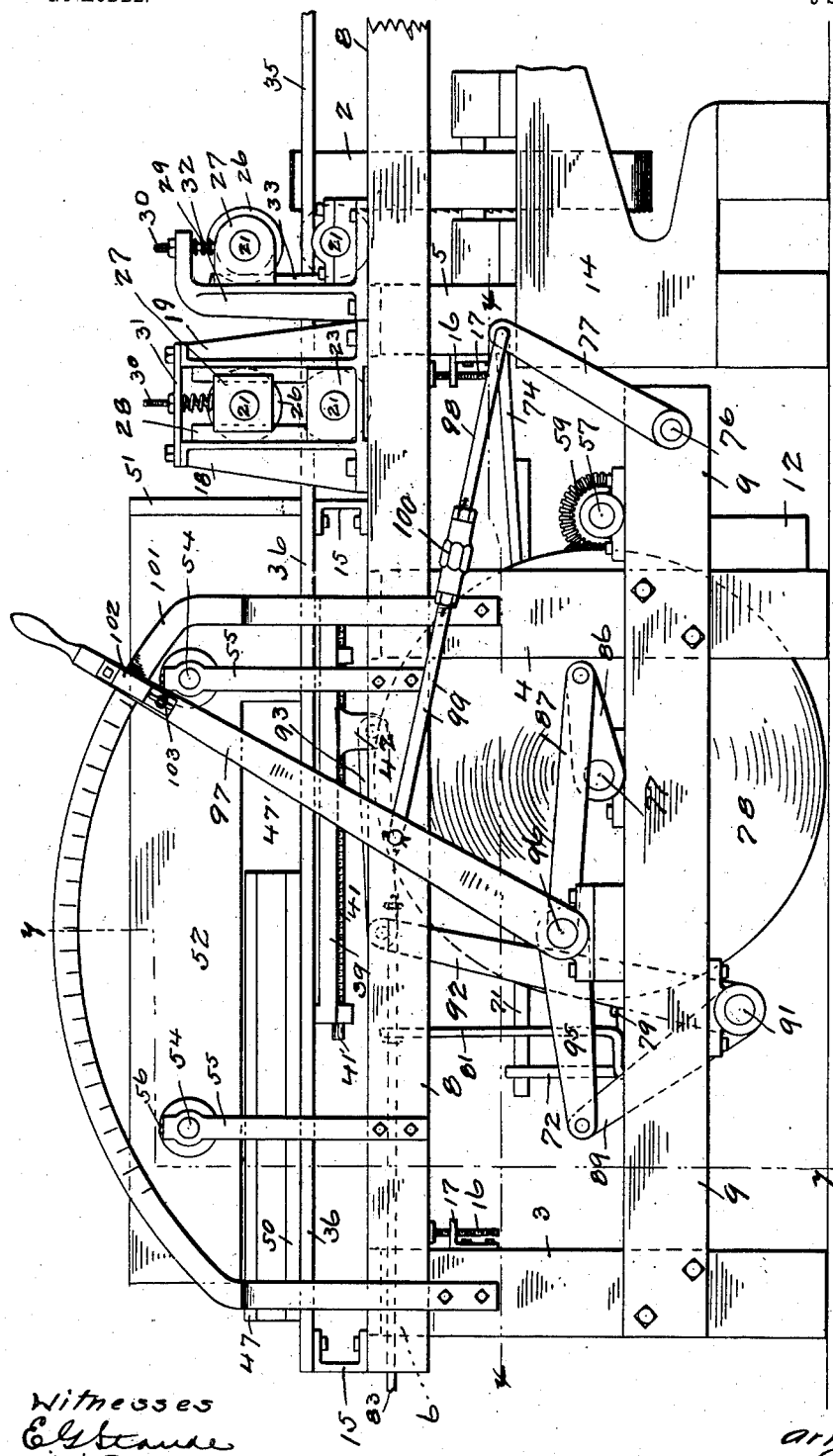
Figure 3:
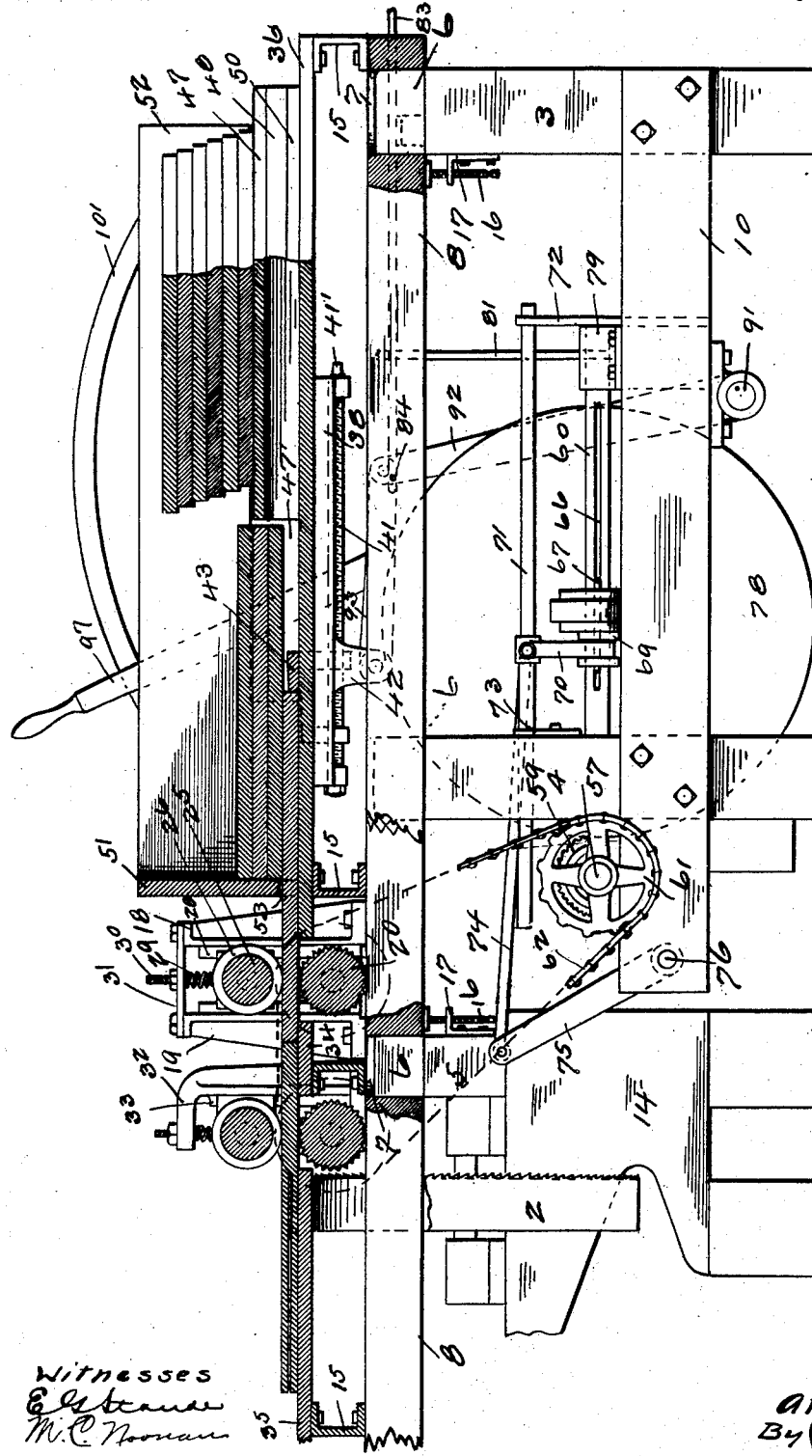

In the accompanying drawings, forming part of this specification, Figure 1 is a plan view of a resawing-machine embodying my invention. Fig. 2 is a side elevation of the same. Fig. 3 is a view similar to Fig. 2 looking toward the opposite side of the machine, the upper portion being shown in longitudinal section. Fig. 4 is a transverse horizontal section substantially on the line $x\,x$ of Fig. 2. Fig. 5 is a transverse vertical section on the line $y\,y$ of Fig. 2. Fig. 6 is a vertical section through the feed-rolls and their supporting-brackets. Fig. 7 is a detail of the mechanism for regulating the stroke or travel of the feeding means shown in position to prevent movement of said feeding means. Fig. 8 is a similar view showing the feed-regulating mechanism in position to allow a half-stroke of the feeding device. Fig. 9 is a detail of the device used for changing the position of the feeding plunger or pusher according to the length of the boards that are being resawed. Fig. 10 is a plan view of the mechanism employed for throwing the friction-drive into and out of its operative position.

In the drawings, 2 represents a horizontal band-saw; 3, 4, and 5, upright posts having tenons 6 at their upper ends to enter mortises 7 in horizontal timbers 8. The posts 3 and 4 are rigidly connected near their lower ends by timbers 9 and 10, extending lengthwise of the machine, and cross-timbers 11 and 12 connect the opposite posts 3 and 4, said last-named timbers being connected by parallel bars 13, arranged near the middle of the frame. The timbers 8 project beyond the posts 4 over the posts 5, being supported thereon as described, and a suitable casing 14 is provided on the posts 5, partially concealing and protecting the saw. The timbers 8 are connected by the transverse channel-bars 15, securely bolted thereto, and said timbers are vertically adjustable on the supporting-posts by means of screws 16, supported in brackets 17 on the posts 3 and 5. By means of these screws the frame-bed or table can be raised or lowered to vary its adjustment with respect to the cutting edge of the saw, according to the thickness of the lumber.

Mounted upon the timbers 8, upon each side of the machine, are standards 18 and 19, between which is a corrugated roll 20, having studs 21 and 22 mounted in fixed bearings 23, the stud 22 being longer than the other and provided with a sprocket 24. Above said corrugated roll is a roll 25, whereon a series of yielding rings 26, of rubber or other suitable material, are secured. These rings yield to conform to and neutralize any slight variation in the thickness of the boards that would affect the uniformity of the cut and prevent a thinner piece that might be next to a thicker one from slipping and interrupting the continuous feed, which might occur if both rolls were provided with unyielding surfaces. The roll 25 is provided with studs similar to the studs 21 and mounted in vertically-movable bearings 27, that are adapted to slide between guides 28 on said brackets and are normally held in a depressed position by springs 29, provided on adjustable screws 30, mounted in plates 31. By raising or lowering the screws 30 the rolls can be adjusted for lumber of different thickness and the pressure of the upper feed-roll on the upper surface of the lumber regulated as desired. Between the rolls above described and the saw I prefer to provide another similar set mounted in overhanging brackets 32, provided on one side only of the rolls and having guides 33 for the upper roll, the lower roll having a sprocket 24' and the operation being substantially the same as described with reference to the first set. The cutting edge of the saw is preferably arranged about two inches from the vertical centers of the rolls last described, and when the rolls are adjusted by the vertical movement of the table-timbers it will be opposite the middle of the ends of the horizontal row of boards and will engage the same endwise as they pass side by side from between the rolls, splitting them evenly from end to end, so that each section will present smooth even surfaces to the stencil. I prefer to provide a plate 34 between the sets of rolls supported upon a transverse channel-bar similar to those described, said plate serving as a support for the lumber as it passes from one set of rolls to the other, and I also provide a table 35 on the discharge side of the saw supported by a channel-bar, and wherefrom the lumber is removed by an attendant as soon as it has passed the saw.

Upon the channel-bars 15 on the receiving side of the first set of rolls is a plate 36, forming the bottom of the hopper, wherein a casting 37, with its upper surface flush with the upper surface of the plate, is arranged. This casting is provided with depending flanges or ribs 38, having horizontal slots 39 to receive a sliding plate 40, that carries a threaded rod 41, provided with a squared end 41' to engage a crank and secured by a suitable lock-nut at the other end to said plate. Lugs 42 depend from said plate upon each side of said threaded rod.

43 is a reciprocating follower adapted to travel over the bottom 36 of the hopper through a longitudinally-arranged slot 44 in the casting 37, said casting having flanges 45 to enter slots in a depending part 46 of said follower and act as a guide therefor, said depending part having a threaded opening to receive the rod 41, and whereon said follower is adjustable over the surface of the plate according to the length of the stock that is to be fed.

47 is a movable hopper, platform, or table, having side rails 48, provided with outwardly-turned feet 49, that slide in guides 50 on the plate 36, said platform being elevated a sufficient distance above said plate to allow the follower to travel back and forth between them during a portion of its stroke. The platform 47 is adapted to support a pile of boards placed thereon preparatory to being pushed forward into the hopper proper, 47', wherein the boards are piled one above the other and allowed to drop down one at a time into the path of the follower.

51 represents the forward end or wall of the hopper, and 52 the sides thereof, which with said end inclose the table 47 and the hopper on three sides.

In Fig. 3 I have shown a pile of boards on the table 47 ready to be placed in the hopper, and I have also shown a series of boards one above the other in the hopper, the lower layer being engaged and pressed forward endwise toward the saw by the action of the follower through a space 53, provided between the wall 51 and the plate 36. The table 47 is removable to permit access to the follower and is movable back and forth between its guides, according to the length of the boards that are being resawed. If the lumber is short, the table will be moved in toward the head of the hopper to a convenient position for the operator to push the pile of boards into the path of the follower, the length of the hopper proper being increased or decreased as the platform is moved in or out.

It is desirable in resawing the lumber for boxes of different depth or width to provide means for regulating the width of the hopper according to the number and width of the boards in the layers. I therefore mount one of the walls 52 upon rods 54, that are horizontally adjustable in brackets 55 on the vertically-movable platform, and having set-screws 56, by means of which said rods can be locked in any desired position. The follower of course will operate beneath the adjustable wall over the full width of the hopper; but by means of said adjustable wall the attendant can easily increase or decrease the width of the space where the lumber is placed to compensate for the difference in size of the boxes for which the lumber is resawed.

Mounted in bearings in the lower part of the frame is a horizontal shaft 57, provided with a driven pulley 58 and a beveled gear 59, that meshes with a similar gear of the same size on a shaft 60. A sprocket 61, of the same size as the sprockets 24 and 24', is provided on the shaft 57, and all these sprockets are connected by a chain 62, whereby both sets of feed-rolls and the shaft 60 are operated at the same speed. The shaft 60 is provided with a keyway 66, in which a feather or spline 67 on a friction-drive wheel 68 is slidable. A collar 69 is provided on said friction-drive and connected by a strap 70 with a rod 71, supported upon a standard 72 and in a bearing 73 on the post 4. The strap 70 is slidable along said rod and when operated will move the friction-drive along the shaft 60. The strap 70 is pivotally connected by a rod 74 with an arm 75, provided on a rock-shaft 76, said shaft having an operating-lever 77.

77' is a horizontal shaft mounted in bearings on the timbers 13 and provided at one end with a flat-surfaced disk 78, lying in a vertical plane substantially at right angles to the direction of rotation of the friction-drive 68. The shaft 60 at one end is mounted in a sliding box 79, that is connected by a link 80 with a bar 81, pivoted at its lower end on the frame and connected at its upper end by a link 82 with a horizontally-moving lever 83, secured at its inner end to an eyebolt 84 on the frame and projecting beyond said frame at its outer end and having a suitable handle and movable over a rack-bar 85. Movement of this lever 83 back and forth over the rack-bar will move the friction-drive into engagement with the disk or withdraw it from contact therewith, and the engagement of said drive-wheel with the surface of said disk will revolve the same and the shaft 77', the speed gradually decreasing as said wheel is moved from the center toward the circumference of the disk. This, however, is a common mechanical arrangement for driving mechanisms of various kinds, and I make no claim broadly to the same herein.

Upon the opposite end of the shaft 77' from the disk 78 is a crank-arm 86, provided with a pitman 87, having a forked end wherein the ends of links 88 and 89 are pivoted, the former having a pivot-pin 88', connecting it with an arm 90 on a rock-shaft 91, and a second arm 92 on said rock-shaft is pivotally connected by a link 93 with a yoke 94, that is mounted in bearings in the lugs 42. The link 89 has a pivot-pin 89', connecting it to a crank-arm 95, secured on a stud 96, having bearings on the frame of the machine and provided with an oscillating operating-lever 97, which is pivotally connected with the lever 77 by rods 98 and 99, having threaded ends connected by a turnbuckle 100, the points of connection of said rods to their levers being equidistant from the supports of said levers, whereby movement of the lever 97 will impart a corresponding movement to the lever 77, rock the shaft 76, and slide the friction-drive 68 along its shaft to change the speed of the disk.

101 represents a curved bar having legs secured to the posts 3 and 4 and provided with a series of marks representing inches of a scale, over which the lever 97 is movable along the bar on one side thereof, and a strap 102 is provided on the other side of the bar, bolted at one end to the lever and secured thereto at the other end by a screw and thumb-nut 103. Any lost motion and inaccuracy of fitting can be taken up by the turnbuckle, and by means of the strap and thumb-nut the lever 97, having been properly adjusted to give the desired speed and stroke to the follower, can be securely locked on the scale-bar. The links 88 89 and the arms 90 and 95 are the same length between the centers of their pivots, and the length of the arm 92 to the length of said arms 90 and 95 is in the ratio of two to one, and in this machine I have provided pivotally-connected links and arms that are twelve inches in length to twenty-four inches of the arm 92, and the latter will have a maximum stroke of two feet to move the follower a corresponding distance while handling boards that are four feet in length. The arm 92 will always stop at the same point in its movement toward the feed-rolls; but the operator by means of the threaded rod 41 can adjust the follower toward or from the feed-rolls, according to the length of the boards in the hopper. The connections between the follower and the rock-shaft 91 will cause the follower to travel faster during the first part of its stroke than during the last part and move the bottom layer of boards out of the hopper toward the rolls at a higher speed than the preceding layer moves between the rolls. It follows, therefore, that each layer of boards engaged and fed forward by the follower will overtake the preceding layer and contact with the rear ends thereof before it reaches the saw and form an unbroken stream of boards through the rolls and a continuous feed to the saw, preventing undue strain and vibration thereof.

I prefer to provide a friction-drive having a diameter of six inches and regulate the speed of the driving-shaft so that when the friction-drive is adjusted to engage the disk three inches from the center thereof the follower will make one hundred strokes per minute in feeding boards that are one foot in length and feed one hundred lineal feet per minute. The first set of feed-rolls are arranged, preferably, six inches from the end of the hopper, and the follower will be adjusted in handling twelve-inch stock to reach the limit of its stroke six inches from the end wall of the hopper or twelve inches from the rolls, which, as heretofore stated, having the same speed as the friction-drive will draw the bottom layer of boards out of the hopper in time to allow the boards above to drop down where the ends of the second layer will be engaged and advanced when the follower begins its second stroke.

In a machine with the six-inch driving-wheel every three inches of movement of the wheel from the center of the disk reduces the speed of the disk and follower one-half, and through the link connections between the follower, the operating-lever, and the disk-shaft there will be a corresponding increase in the length of the stroke. For twenty-four-inch stock the friction-drive would be set six inches from the center, reducing the speed of the follower to fifty strokes per minute, and so on, the change in the speed and stroke being effected simultaneously by movement of the single operating-lever 97. The rods 98 and 99 being equal distances from the pivots of the levers 77 and 97—in this machine twelve inches—movement of the operating-lever will impart a corresponding movement to the lever 77 and the drive-wheel.

In the position shown in Fig. 2 the operating-lever is set at zero, the pivot-pins 88' and 89' will coincide, the friction-drive will be on the center of the disk, and there will be no movement of the follower.

If it is desired in this machine to resaw lumber twenty-four inches in length, the lever will be set to the position shown in Fig. 8, or the middle stroke, in which position the pivot-pin 89' will be midway between the center of the rock-shaft 91 and the pivot-pin 88'. Further movement of the operating-lever toward the left and the consequent movement of the pivotally-connected end of the link 89 and the crank-arm 95 toward the rock-shaft 91 will increase the stroke of the follower until the pivot-pin 89' is coincident with the center of the rock-shaft 91, at which point the oscillating arm 92 will have reached its greatest length of stroke and in this machine be adapted to handle lumber forty-eight inches in length.

I have shown and described a machine arranged to feed any length of box-lumber up to and including four feet; but I do not wish to confine myself to a machine so constructed, as it can be readily adapted to handle boards of greater length, if desired.

One board or a series of them placed side by side can be fed simultaneously to the saw the full width of the machine or less, according to the size of the box, and the boards so fed will, when split horizontally, be of uniform thickness and have smooth even surfaces when placed together to receive the stencil marks or brands.

I claim as my invention—

1. In a resawing-machine, the combination, with a horizontal band-saw, of the feed-rolls, a reciprecating feed device arranged to engage the ends of boards placed side by side and deliver them simultaneously to said rolls, and means within control of the operator for changing the speed and stroke of said feed device according to the length of the boards to be resawed.

2. In a resawing-machine, the combination, with a horizontal band-saw and its feed-rolls, of a table adapted to receive a plurality of boards placed side by side, a reciprocating feed device operating over said table and adapted to engage the outer ends of the boards and advance them simultaneously into said rolls, and a lever-controlled mechanism for changing the speed and stroke of said feed device according to the length of the boards to be resawed.

3. In a resawing-machine, the combination, with a band-saw and its feed-rolls, of reciprocating means for feeding the lumber thereto, means for driving said feeding means, operative connections provided between said driving means and said feeding means, and means within control of the operator for changing the position of said operative connections to regulate the stroke of said feeding means, substantially as described.

4. In a resawing-machine, the combination, with a band-saw and its feed-rolls, of reciprocating means for feeding the lumber to said rolls, a variable-speed mechanism for driving said feeding means, operative connections provided between said variable-speed mechanism and said feeding means, and means within control of the operator for changing said variable-speed mechanism and the position of said operative connections to regulate the speed and stroke of said feeding means.

5. In a machine for resawing box-boards, the combination, with a band-saw and the feed-rolls, of a table adapted to support a plurality of boards arranged one upon another with contacting edges endwise to the saw, a reciprocating follower adapted to engage the outer ends of the boards and advance those in each layer simultaneously toward the saw, means for operating said follower, a link mechanism connecting said operating means and said follower, and means within control of the operator for moving said link mechanism to regulate the length of stroke of said follower according to the length of the boards to be resawed.

6. In a resawing-machine, the combination, with a saw, of a feed device, a variable-speed mechanism and a compound link mechanism connected with said feed device, and means within control of the operator for moving said speed mechanism and said link mechanism to change the speed and stroke of said feed device, for the purpose specified.

7. In a machine for resawing box-boards, the combination, with a saw, of a feed device, a suitable driving means, a link mechanism connecting said feed device with said driving means, a lever, a bar provided with a suitable scale, and means for adjusting said lever on said bar according to the length of the boards to be resawed.

8. In a machine for resawing box-boards, the combination, with a horizontal band-saw, of a table, a reciprocating follower operating over said table, a suitable driving means for said follower, a link mechanism connecting said driving means with said follower, a lever arranged to move said link mechanism to change the length of stroke of said follower, a bar provided with a suitable scale, and said lever being adjustable over said scale, for the purpose specified.

9. In a resawing-machine, the combination, with the saw, of means for feeding the lumber thereto, a variable-speed mechanism for driving said feeding means, a single operating or set lever, and operative connections provided between said lever and said driving mechanism and said feeding means, whereby movement of said lever will simultaneously change the speed and length of stroke of said feeding means.

10. In a machine for resawing box-boards, the combination, with a horizontal band-saw, of feed-rolls having yielding surfaces between which the boards are fed to the saw, a table adapted to receive a plurality of boards forming a complete bottom, side or top of a box, placed side by side with contacting edges, and a reciprocating follower operating over said table and arranged to engage the outer ends of said boards and feed them simultaneously to said rolls, whereby a uniform resaw and a smooth even surface for the stencil will be obtained.

11. In a machine for resawing box-boards, the combination, with a horizontal band-saw, of a table, a follower operating over said table, a variable-speed mechanism and a compound link mechanism connected with said follower, and a lever arranged to operate said speed and said link mechanisms to simultaneously change the speed and length of stroke of said follower.

12. In a resawing-machine, the combination, with a horizontal band-saw and the feed-rolls, of a hopper wherein the boards are placed one above another, a follower operating over the bottom of said hopper to advance the boards endwise toward the saw, a variable-speed mechanism, an operating-lever having a crank-arm 95, a rock-shaft 91, an arm 92 secured thereon and connected with said follower, a second arm 90 also secured on said rock-shaft, a compound link mechanism connecting said speed mechanism with said arms 90 and 95, a lever 77 having operative connections with said speed mechanism, and suitable connections provided between said lever 77 and said operating-lever, whereby movement of the latter will simultaneously operate said speed mechanism to change the speed of said follower and move said links to vary the length of its stroke.

13. The combination, with a saw, of a hopper wherein the boards are placed, a follower operating over the bottom of said hopper to engage the boards and advance them toward the saw, a shaft 77' having a crank-arm 86, means for driving said shaft, a rock-shaft 91, an arm 92 secured thereon and pivotally connected with said follower, an arm 90 also secured on said rock-shaft, an operating-lever 97 having a crank-arm 95, a link 87 pivotally connected with said arm 86, and links 88 and 89 pivotally connecting said link 87 with said arms 90 and 95 respectively.

14. The combination, with a horizontal band-saw, of a plate or table whereon the boards are piled one above another, a follower arranged to reciprocate over said table and engage the bottom board of the pile and advance it endwise toward the saw, a friction-drive device, a rock-shaft 91, an arm 92 secured thereon and pivotally connected with said follower, an arm 90 also secured on said rock-shaft, an operating-lever having a crank-arm 95, a compound link mechanism pivotally connecting said friction-drive with said arms 90, and 95, a rack-bar provided with a suitable scale over which said operating-lever is movable, a lever 77 having operative connections with said friction-drive, and suitable means connecting said lever 77 and said operating-lever, whereby movement of the latter will change said friction-drive to vary the speed of said follower and move said crank-arm 95 to change the position of said links and alter the stroke of said follower.

15. The combination, with a horizontal band-saw, of a plate or table whereon the boards are piled one above another, a follower operating over said floor to advance the bottom boards toward the saw, a shaft 77', having a crank-arm 86, variable-speed means for revolving said shaft, a rock-shaft 91 having an arm pivotally connected with said follower, an arm 90 also provided on said rock-shaft, an operating-lever having a crank-arm 95, links 87, 88 and 89 pivotally connecting said crank-arms 86 and 95 and said arm 90, a lever 77 having operative connections with said variable-speed means, and suitable connections provided between said lever 77 and said operating-lever, whereby movement of said operating-lever will change the speed of said shaft 77' and of said follower and the position of said links and the crank-arm 95 to alter the stroke of said follower, substantially as described.

16. In a machine for resawing box-boards, the combination, with a saw and its feed-rolls operating at a uniform speed, of means for engaging the outer ends of the boards and feeding them to said rolls, said feeding means operating faster at the beginning than at the end of its stroke, whereby each succeeding feed of boards will overtake the preceding one before it leaves the rolls and a continuous feed to the saw will be provided.

17. In a machine for resawing box-boards, the combination, with a horizontal band-saw and its feed-rolls operating at a uniform rate of speed, of a table adapted to receive boards placed one above another thereon, and means for engaging the outer end of each layer of boards and advancing them simultaneously into said rolls, and said engaging means operating faster at the beginning than at the end of its stroke, whereby each successive layer of boards will overtake the preceding one before it leaves the rolls and the feed to the saw will be continuous.

18. In a machine for resawing box-boards, the combination, with a band-saw and its feed-rolls operating at a uniform speed, of a table, a reciprocating follower operating over said table, a rock-shaft, an arm thereon, a link connecting said arm and follower, means for rocking said shaft, a lever, and operative connections provided between said shaft, said rocking means and said lever, substantially as described and for the purpose specified.

19. The combination, with the feed-rolls, of a plate or table whereon the boards are placed side by side endwise to the rolls and in layers one above another, a follower arranged to engage the outer ends of the bottom layer and advance it toward the rolls, a variable-speed mechanism for operating said follower, an operating or set lever, a suitable mechanism connecting said lever and said operating mechanism, and a compound link mechanism connecting said lever and follower, whereby when said lever is operated said variable-speed mechanism will be moved to change the speed of said follower and said link mechanism will be actuated to change the stroke.

20. In a machine for resawing box-boards, the combination, with a band-saw, of feed-rolls between which the boards are fed endwise to the saw, a board-supporting table, a follower operating over said table and arranged to engage the outer ends of the bottom layer of boards and feed them lengthwise toward said rolls, and means within control of the operator for changing the speed of said follower to advance the forward end of each successive series of boards into contact with the rear ends of the preceding series before the latter leave said rolls, whereby the feed will be continuous and vibration and strain of the saw avoided.

21. In a resawing-machine, the combination, with a band-saw and the feed-rolls, of a table, a reciprocating follower arranged to operate on said table and engage the outer ends of the bottom layer of boards and advance them toward the saw, means for adjusting said follower to vary the distance of the inner limit of its stroke from the rolls and saw according to the length of the boards, and means within control of the operator for varying the speed of said follower to advance the inner end of each layer of boards as it is fed forward into contact with the rear end of the preceding layer as it passes between the rolls, whereby the feed will be continuous and vibration of the saw prevented.

22. In a machine for resawing box-boards, the combination, with a horizontal band-saw and its feed-rolls, of a table, a reciprocating follower operating over said table to advance the boards endwise to said rolls, a variable-speed mechanism for operating said follower, a lever, and suitable connections provided between said lever and said speed mechanism whereby the movement of the former will change the latter to regulate the speed of said follower according to the length of the lumber to be resawed.

In witness whereof I have hereunto set my hand this 13th day of December, 1902.

ARNO MEREEN.

In presence of—
RICHARD PAUL,
M. C. NOONAN.